United States Patent
Takeuchi

[19]

[11] Patent Number: 6,057,944
[45] Date of Patent: May 2, 2000

[54] IMAGE SCANNING DEVICE

[75] Inventor: Shigeki Takeuchi, Ohtsu, Japan

[73] Assignee: Murata Kikai Kabushiki Kaisha, Kyoto, Japan

[21] Appl. No.: 09/040,601

[22] Filed: Mar. 18, 1998

[30] Foreign Application Priority Data

Mar. 19, 1997 [JP] Japan .................................. 9-066305

[51] Int. Cl.$^7$ ................................................. H04N 1/04
[52] U.S. Cl. ......................... 358/468; 358/474; 358/496; 358/497; 358/498
[58] Field of Search .................................. 358/486, 488, 358/497, 468, 496, 474, 434, 498; 399/211, 205, 208

[56] References Cited

U.S. PATENT DOCUMENTS

| | | | |
|---|---|---|---|
| 4,645,328 | 2/1987 | Shiraki et al. ........................ | 399/208 |
| 4,870,501 | 9/1989 | Yoshida ................................ | 358/488 |
| 5,734,483 | 3/1998 | Itoh .................................... | 358/496 |
| 5,734,758 | 3/1998 | Yamamoto et al. .................. | 358/461 |
| 5,900,950 | 5/1999 | Hsu ..................................... | 358/497 |
| 5,917,616 | 6/1999 | Chou et al. .......................... | 358/488 |

FOREIGN PATENT DOCUMENTS

| | | | |
|---|---|---|---|
| 0399970A1 | 11/1990 | European Pat. Off. ........ | G03B 27/50 |
| 60-178773 | 9/1985 | Japan ............................... | H04N 1/40 |
| 62-200344 | 9/1987 | Japan ............................... | G03B 27/50 |
| 06-205173 | 7/1994 | Japan ............................... | H04N 1/04 |
| 06-291944 | 10/1994 | Japan ............................... | H04N 1/04 |
| 08-050338 | 2/1996 | Japan ............................... | G03B 27/72 |
| WO91/10309 | 7/1991 | WIPO .............................. | H04N 1/00 |

*Primary Examiner*—Cheukfan Lee
*Attorney, Agent, or Firm*—Loeb & Loeb, LLP

[57] ABSTRACT

An image scanning device including a flat bed, a cover for the scanning table, a scanning portion, a carriage for supporting the scanning portion, an automatic document feeder (ADF), a detector for detecting a communication control signal from a remote communication device, and a controller. Upon detecting of the communication control signal (e.g. DIS signal), the controller causes the carriage to move from a stand-by position to either a scanning start position of the ADF, or a scanning start position for scanning a document placed on the flat bed, depending on whether a document is present or not present at the ADF. The time required between the user's pressing the start key and the start of the scanning is reduced.

2 Claims, 6 Drawing Sheets

IMAGE SCANNING DEVICE

BACKGROUND OF THE INVENTION

1. Technical Field

The present invention relates to an image scanning device incorporated in, for example, a copier or facsimile apparatus to scan an image or picture on an original document.

2. Background Art

Among image scanning devices of the above-mentioned kind, one having a flat bed scanner needs a pre-scanning preparation such as placing an original document on a document plate (flat bed or scanning table) and closing a cover over the original document. After such preparation, a user presses a scanning start key on an operation panel, for example. Upon pressing the start key, a carriage which supports at least part of an optical scanner is moved from a stand-by position to a scanning start position, and the scanning operation starts.

In the conventional image scanning device, a certain period is required until the scanning starts after the user presses the scanning start key since the carriage moves from the stand-by position to the scanning position upon pressing the scanning start key. Accordingly, the user must wait for a while until the scanning starts after his or her panel operation.

Another type of image scanning devices has a communication function. After a user dials or enters a telephone number (facsimile number) of a remote facsimile machine and presses a start key to initiate scanning of a document, a carriage which supports a scanning unit or portion is moved from a stand-by position to a scanning position. The user does not know whether the line is busy or not when the user presses the start key. Therefore, there is a possibility that the carriage is meaninglessly moved to the scanning position. In other words, the carriage is moved to the scanning position regardless of a fact that the line between the remote facsimile machine and the image scanning device is busy.

SUMMARY OF THE INVENTION

The present invention was developed in consideration of the above problem of the conventional image scanning device.

An object of the present invention is to provide an image scanning device which can reduce the time delay between the user's panel operation and the start of the scanning.

Another object of the present invention is to provide an image scanning device having a communication function which can prevent wasteful movement of a carriage supporting a scanning portion of the image scanning device.

According to the first aspect of the present invention, there is provided an image scanning device of a type having a scanning portion and a carriage for supporting at least part of the scanning portion, the carriage being adapted to move from a stand-by position to a scanning start position, comprising detection means for detecting a preparation operation related to the image scanning (i.e., means for detecting movement of a particular component of the image scanning device which is unavoidably operated before the image scanning) and control means for causing the carriage to move from the stand-by position to the scanning start position upon detection of the preparation operation by the detection means.

In order to scan a document image, the user performs a series of operations and various components of the image scanning device are operated according to the user's operations. For instance, the user first places the document on a scanning table, and then places a cover over the document. After that, the user presses a scanning start button. The detection means may detect movement of the cover. The carriages may be moved to the scanning start position when the cover approaches the scanning table. As a result, the carriage is moved to the scanning start position before the user presses the scanning start button. Therefore, the scanning starts immediately when the user presses the start button. In other words, the time required between the user's pressing the start button and the start of the scanning is significantly reduced (or eliminated). With the conventional image scanning device, on the other hand, the user must wait for a while after pressing the scanning start button since the carriage supporting the scanning portion is moved to a scanning start position after the start button is pressed.

According to the second aspect of the present invention, there is provided an image scanning device of a type having a scanning portion and a carriage for supporting at least part of the scanning portion, the carriage being adapted to move from a stand-by position to a scanning start position and the image scanning device having a communication function (facsimile data transmission function) for communication with a remote communication device such as a facsimile machine, comprising second detection means for detecting a communication (fax) control signal (e.g., DIS: Digital Identification Signal) sent from the remote facsimile machine and control means for causing the carriage to move from the stand-by position to the scanning start position upon detection of the communication control signal by the second detection means.

If the user wants to send a document in the form of image data (or facsimile data) to a remote facsimile machine, the image scanning device should scan an image on the document. Before moving the scanning portion to the scanning start position, it is determined whether the remote facsimile machine is able to receive the facsimile data from the image scanning device of the invention. This determination is carried out using the communication control signal sent from the remote facsimile machine. If the remote facsimile machine cannot communicate with the image scanning device of the invention, the carriage is not moved to the scanning start position. Therefore, wasted movement of the carriage is prevented.

The image scanning device may include an automatic document feeder to successively feed a plurality of documents to the scanning portion and a scanning table (e.g., flat bed) on which one document sheet is placed at a time, and the scanning portion may be enabled to either selectively scan the documents subsequently supplied to the scanning portion or to scan a single document at a time. The scanning start position of the carriage may differ depending upon how the image scanning should be performed. In other words, the scanning start position of when the scanning portion successively scans the documents may be different from that of when the scanning portion scans the single documents one at a time.

These and other objects, aspects and advantages of the present invention will become apparent to those skilled in the art to which the invention relates from the following detailed description of preferred embodiments and the appended claims as read in conjunction with the accompanying drawings.

BRIEF DESCRIPTION OF THE ACCOMPANYING DRAWINGS

DETAILED DESCRIPTION OF THE PREFERRED EMBODIMENTS

Now, a preferred embodiment of the present invention will be described with reference to the accompanying drawings. The following description deals with a specific example of an embodiment of the present invention when used in a copier-facsimile hybrid system.

Figure 1:
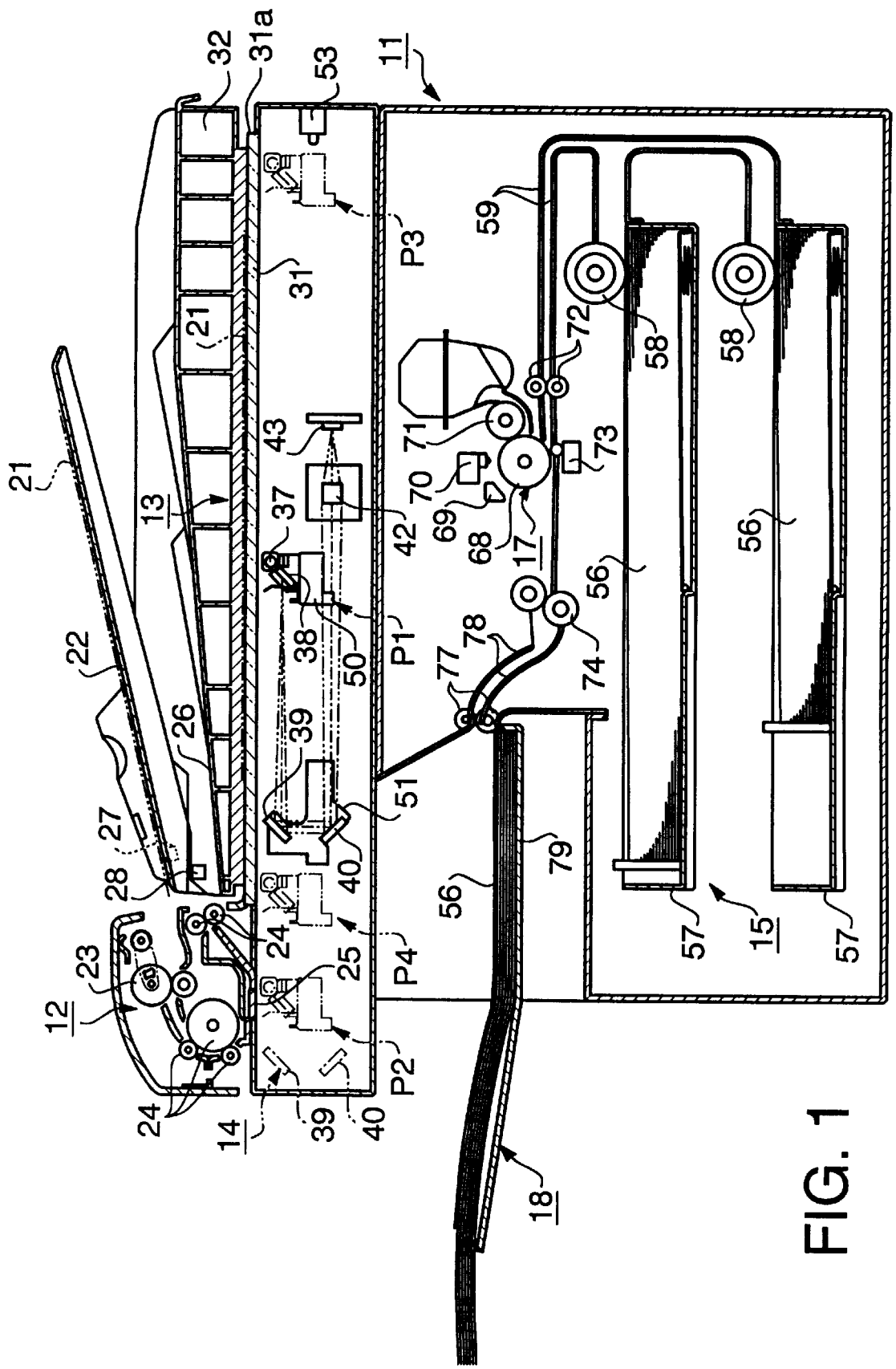
FIG. 1 illustrates a sectional view of an image scanning device according to the present invention.

Referring to FIG. 1, a copier-facsimile system 11 includes a document feeder unit or portion 12, a document table portion 13, a scanning portion 14, a cut paper feeder 15, a recording portion (printing unit) 17 and a cut paper discharge tray 18.

The document feeder portion 12 includes a document tray 22 for placing one or more documents 21, a separation roller 23 for separating and feeding the documents 21 sheet by sheet, a plurality of feed rollers 24 to transport the document 21 along a predetermined path, a translucent plate 25 over which the document 21 is transported, and a document discharge tray 26 for receiving the discharged documents 21.

A document sensor 27 for detecting presence of the original document 21 is provided inside the document feed tray 22 so that it faces the documents 21 when the documents are loaded into the tray 22. The document sensor 27 outputs a detection signal to CPU 82 if there is one or more original documents 21 in the tray 22. A second document sensor (i.e., discharged document sensor) 28 for detecting presence of the discharged document 21 is located to face the document discharge tray 26 so that it outputs a detection signal if there is one or more documents 21 in the tray 26.

Figure 3:
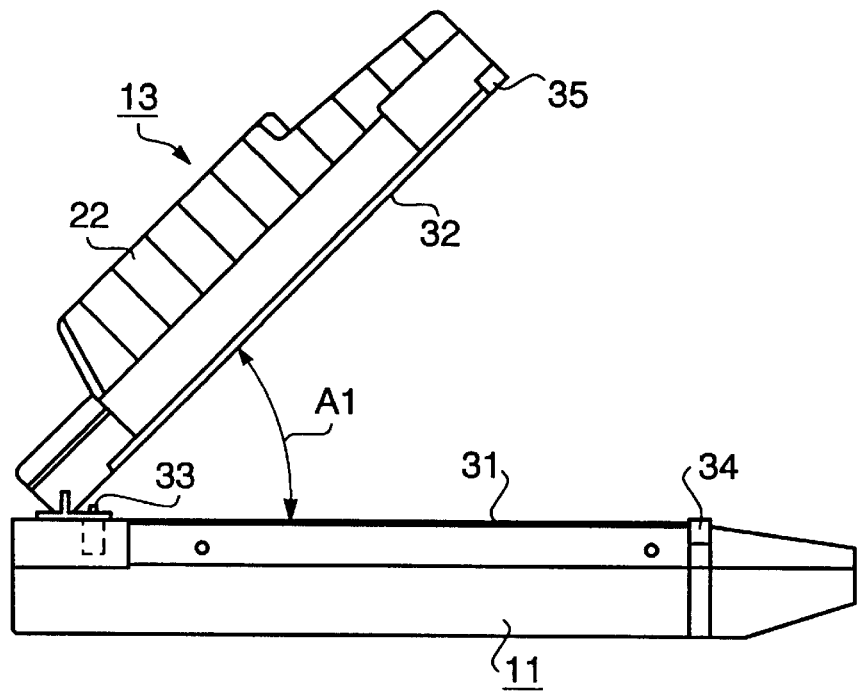
FIG. 3 is a partial sectional view illustrating a cover and associated components of the image scanning device shown in FIG. 1.

FIG. 3 illustrates the document table portion 13 in detail. The document table portion 13 includes a transparent plate (flat bed) 31 on which a single document 21 is placed and a cover or lid 32 provided pivotably on the flat bed 31 for holding the document 21 on the flat bed 31 when it is closed. FIG. 3 shows the cover 32 when it is open. An angle sensor 33 is provided inside the document scanning table 31 at one end of the scanning table 31 near a hinge of the cover 32 such that it faces the cover 32. The angle sensor 33 is used to output a detection signal when an opening angle of the cover 32 as indicated by "A1" in FIG. 3 is below a predetermined value. The angle sensor 33 outputs a detection signal when it is turned on. A magnetic sensor 34 is also provided inside the flat bed 31 near the opposite end of the flat bed 31 such that it outputs a detection signal when the cover 32 is completely closed and contacts a mating magnetic element 35 provided inside the cover 32. The magnetic sensor 34 outputs a detection signal when it is turned on. The angle sensor 33 or magnetic sensor 34 constitutes a detection means.

Figure 2:
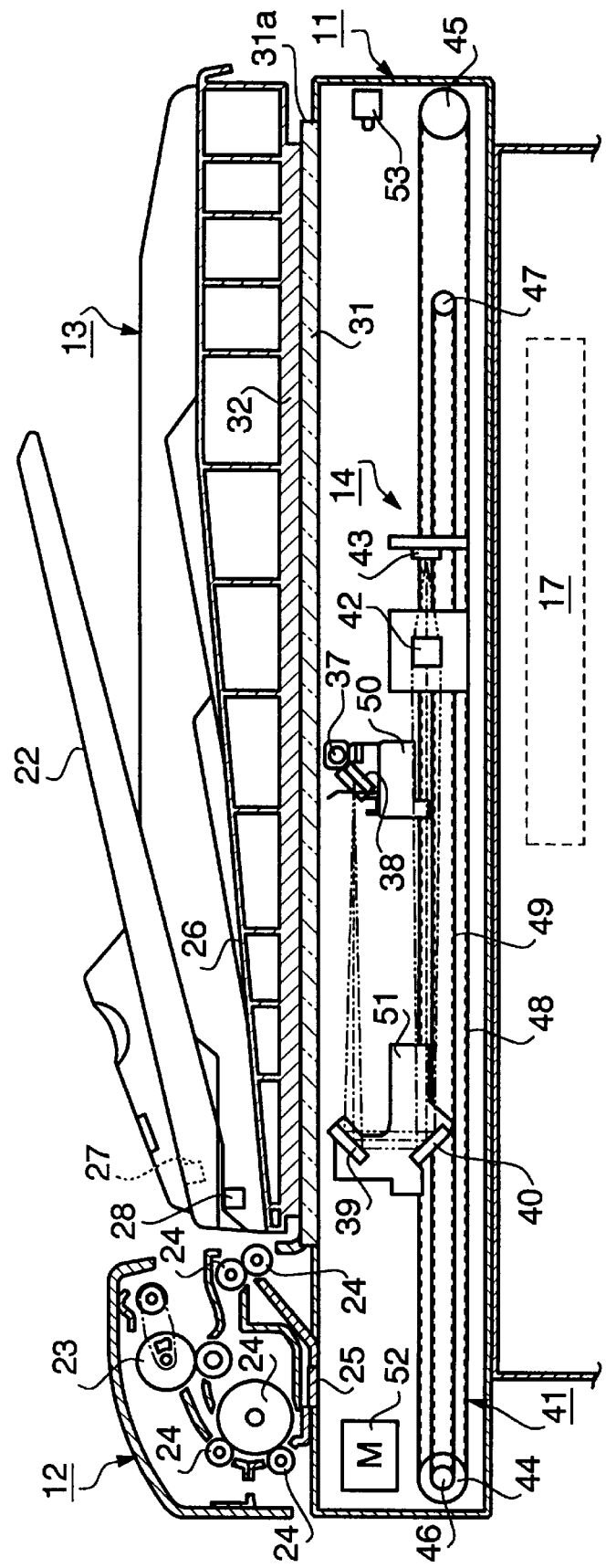
FIG. 2 illustrates an enlarged sectional view of the image scanning device shown in FIG. 1.

FIG. 2 illustrates the document feeder portion 12, the document table portion 13 and the scanning portion 14 in detail.

The document feeding tray 22 and discharged document receiving tray 26 of the document feeder portion 12 are both mounted on the cover 32 of the document table portion 13. Accordingly, the document feeding and receiving trays 22 and 26 move together with the cover 32.

The scanner unit 14 includes a light source 37 for radiating a beam of light to the document 21 passing over the translucent plate 25 or the document 21 held stationary on the flat bed 31, first to third mirrors 38 to 40 for changing a path of the beam of light reflected by the document 21, and a moving mechanism 41 for moving the light source 37 and first, second and third mirrors 38, 39 and 40. The scanning unit 14 further includes a light condensing or convergent lens 42 for condensing the light coming from the third mirror 40 and an image scanning or pick-up element (CCD) 43 for reading the image or picture on the document 21 based on the light incoming through the condensing lens 42.

The translation mechanism 41 includes a pair of right and left large pulleys 44 and 45, a pair of right and left small pulleys 46 and 47, a first belt 48 engaged over the large pulleys 44 and 45, and a second belt 49 engaged over the small pulleys 46 and 47. The translation mechanism 49 also includes a first carriage 50 attached to the first belt 48, a second carriage 51 attached to the second belt 49 and a stepping motor 52.

In the illustrated embodiment, the large pulley 44/45 has a diameter twice as large as the small pulley 46/47. The left large and small pulleys 44 and 46 are coaxially united so that they rotate together. These pulleys are driven by the stepping motor 52. The first carriage 50 supports the light source 37 and first mirror 38 thereon and the second carriage 51 supports the second and third mirrors 39 and 40 thereon.

As the large pulleys 44 and 45 and small pulleys 46 and 47 are rotated by the stepping motor 52, the first and second belts 48 and 49 are moved and in turn the first and second carriages 50 and 51 are moved. In this situation, the first carriage 50 is moved at a speed twice as fast as the second carriage 51. With this speed difference, as illustrated in FIG. 1, the carriages 50 and 51 are moved to an intermediate stand-by position P1, a first scanning position P2 under the translucent plate 25 and a second scanning start position P3 under the right end 31a (reference end) of the flat bed 31 respectively.

The document feeding unit 12 and scanning unit 14 constitute a scanner for automatically and successively scanning a plurality of original documents (ADF: Automatic Document Feeder). The document 21 passing over the translucent plate 25 is scanned while the carriages 50 and 51 remain at the first scanning position P2 (more specifically, the carriage 50 is at the first scanning position P2 and the carriage 51 is on the left side of the carriage 50)). The carriages do not move during scanning; only the original documents move. On the other hand, the document table 13 and scanning unit 14 constitute a flat bed scanner (FBS: Flat Bed Scanner). The image on the original document 21 placed on the flat bed 31 is scanned while the carriages 50 and 51 are being moved from the second scanning start position P3 to a scan ending position P4. The original document does not move; only the scanning unit 14 moves during scanning.

Figure 4:
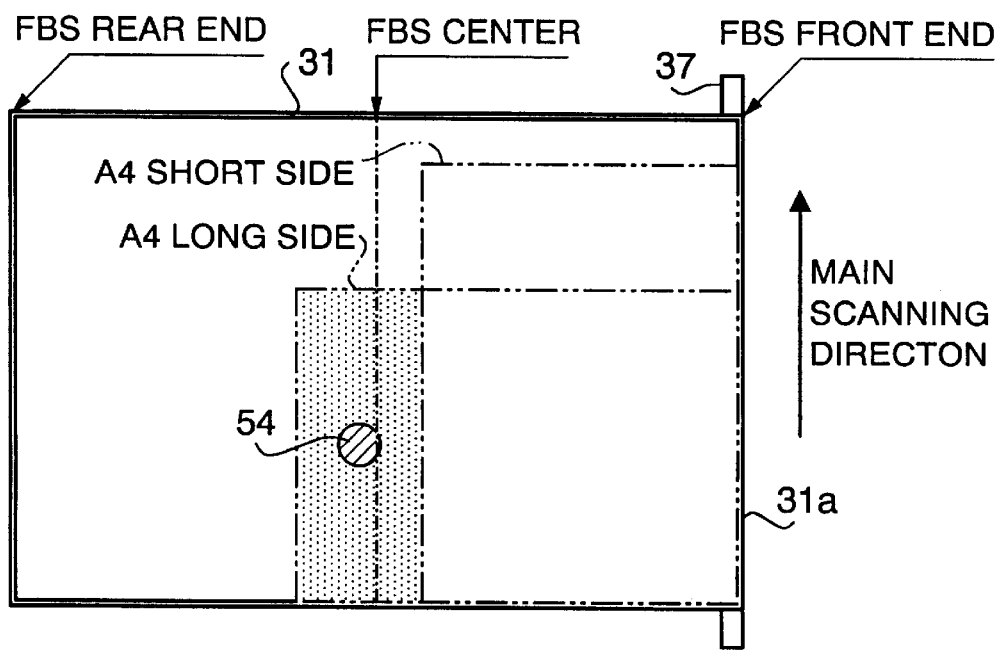
FIG. 4 is a plan view of the image scanning device shown in FIG. 1.

A carriage position sensor 53 is provided below the right end 31a of the flat bed 31 such that it generates a detection signal when the carriages 50 and 51 are in the second scanning start position P3. As illustrated in FIG. 4, a document length sensor 54 is positioned at a fixed distance from the right end (base end) 31a of the flat bed 31 (or near the center of the flat bed 31) as viewed from the top. The document length sensor 54 faces the flat bed 31 such that it detects (or determines) the length of the original document 21 placed on the flat bed 31. It should be noted that the scanning unit 14 including the light source 37 also serves as a document width sensor. The document length sensor 54 is located below the scanning table 31. After the first carriage 50 is moved to the second scanning start position P3 (and the second carriage 51 is moved to between the end position P4 and CCD 43), the width of the document 21 is determined by the scanning unit 14 while the scanning unit 14 performs the scanning of the document 21 in a main scanning direction.

Referring back to FIG. 1, the recording paper feeding unit 15 includes a plurality of paper feed cassettes 57 for holding a stack of recording paper 56 of predetermined size, paper feed rollers 58 for feeding the cut papers 56 sheet by sheet toward the recording unit 17 from the associated cassettes 57, and guide plates 59 for guiding movement of the cut papers 56. In the particular embodiment, there are two paper cassettes 57 and different sizes of sheets 56 are stacked in these cassettes.

The recording unit 17 includes a photosensitive drum 68, an electric charger 69 for uniformly charging a surface of the photosensitive drum 68 to a predetermined voltage, an exposing device 70 for forming an electrostatic latent image of the original on the photosensitive drum 68, and a developing device 71 for feeding a toner over the electrostatic latent image on the photosensitive drum 68 to develop a toner image. The recording unit 17 further includes a pair of feed rollers 72 to feed the cut paper 56 to the photosensitive drum 68, a transfer unit 73 for transferring the toner image to the cut paper 56 from the photosensitive drum 68, and a heating fixer 74 for fixing the toner image on the cut paper 56 by heating it.

The recording sheet discharge tray unit 18 includes a pair of paper discharge rollers 77 for discharging the cut paper 56 after recording (image fixing), a paper discharge tray 79 for receiving the discharged cut papers 56 and guide plates 78 for guiding movement of the cut paper 56 to the discharge tray 79.

Figure 5:
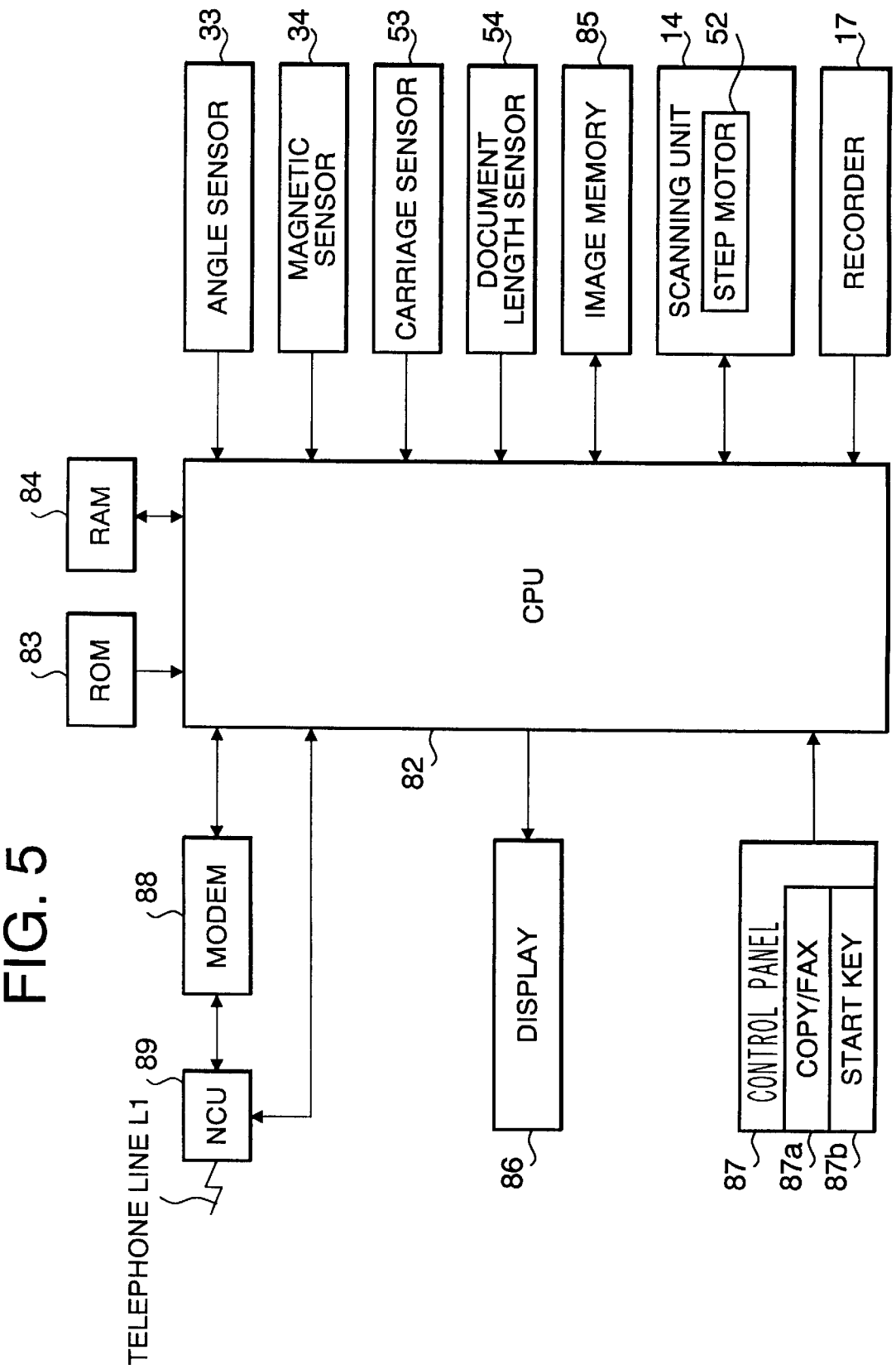
FIG. 5 is a circuitry block diagram of the image scanning device shown in FIG. 1.

A circuitry configuration of the copier-facsimile system 11 having the above described structure will be described with reference to FIG. 5. CPU 82 controls operations of the components of the copier-facsimile system. ROM 83 stores various control programs required by CPU 82. RAM 84 temporarily stores data and the like resulting from execution of the control programs. CPU 82, ROM 83 and RAM 84 constitute a control means.

The angle sensor 33, magnetic sensor 34, carriage sensor 53 and document length sensor 54 output their detection signals to CPU 82 respectively. The scanning portion 14 scans the image on the original document 21 over the translucent plate 25 or scanning table 31 and outputs black and white binary image data to CPU 82. An image memory 85 temporarily stores image data sent from a remote communication device or scanned by the scanning portion 14. The recording portion 17 prints the image data sent from the remote communication device or the image data scanned by the scanner 14 on the recording paper 56.

A display unit 86 includes a liquid crystal panel and/or LEDs to indicate information about the operation of this system 11 such as "COPY MODE", "FAX MODE", "STAND-BY CONDITION" and "ABNORMAL CONDITION/FAILURE". An operation panel unit (or control panel) 87 includes various operation keys such as a copy/fax key 87a and a start key 87b. The copy/fax key 87a is used to select a copy mode or fax mode. A user presses the start key 87b to start the copying or facsimile data transmission.

A modem 88 is also connected to CPU 82 such that it modulates and demodulates data to be sent to and received from the remote communication device. NCU 89 controls connection to and disconnection from a telephone line L1. NCU 89 has other functions such as detection of transmission and reception of a dial pulse corresponding to a facsimile number of the remote communication device.

If the copy mode is selected, the original document 21 is put on the document table 31 and the cover 32 is closed, then CPU 82 receives a detection signal from the angle sensor 33 and/or magnetic sensor 34 indicating that preparation for scanning has been started. Upon receiving one or both of the detection signals from the senors 33 and/or 34, CPU 82 activates the stepping motor 52 of the scanning unit 14 so that the carriages 50 and 51 are moved from the stand-by position P1 to the copy start position (second scanning start position) P3, and waits for a command signal from the control panel 87 which is to be input by a user pressing the start key 87b. When the CPU 82 moves the scanner unit 14 from the position P3 to position P4, the scanning process is started.

If the fax mode is selected and a communication control signal (e.g., DIS) sent from a remote facsimile is detected, CPU 82 activates the stepping motor 52 of the scanning unit 14 to move the carriages 50 and 51 to the first scanning position P2 from the stand-by position P1 or to the second scanning start position P3 from the stand-by position P1. If the original document 21 is placed on the document tray 22, the carriages 50 and 51 are moved to the first scanning position P2. On the other hand, if the document 21 is placed on the document table 31, the carriages 50 and 51 are moved to the second scanning start position P3.

Figure 6:
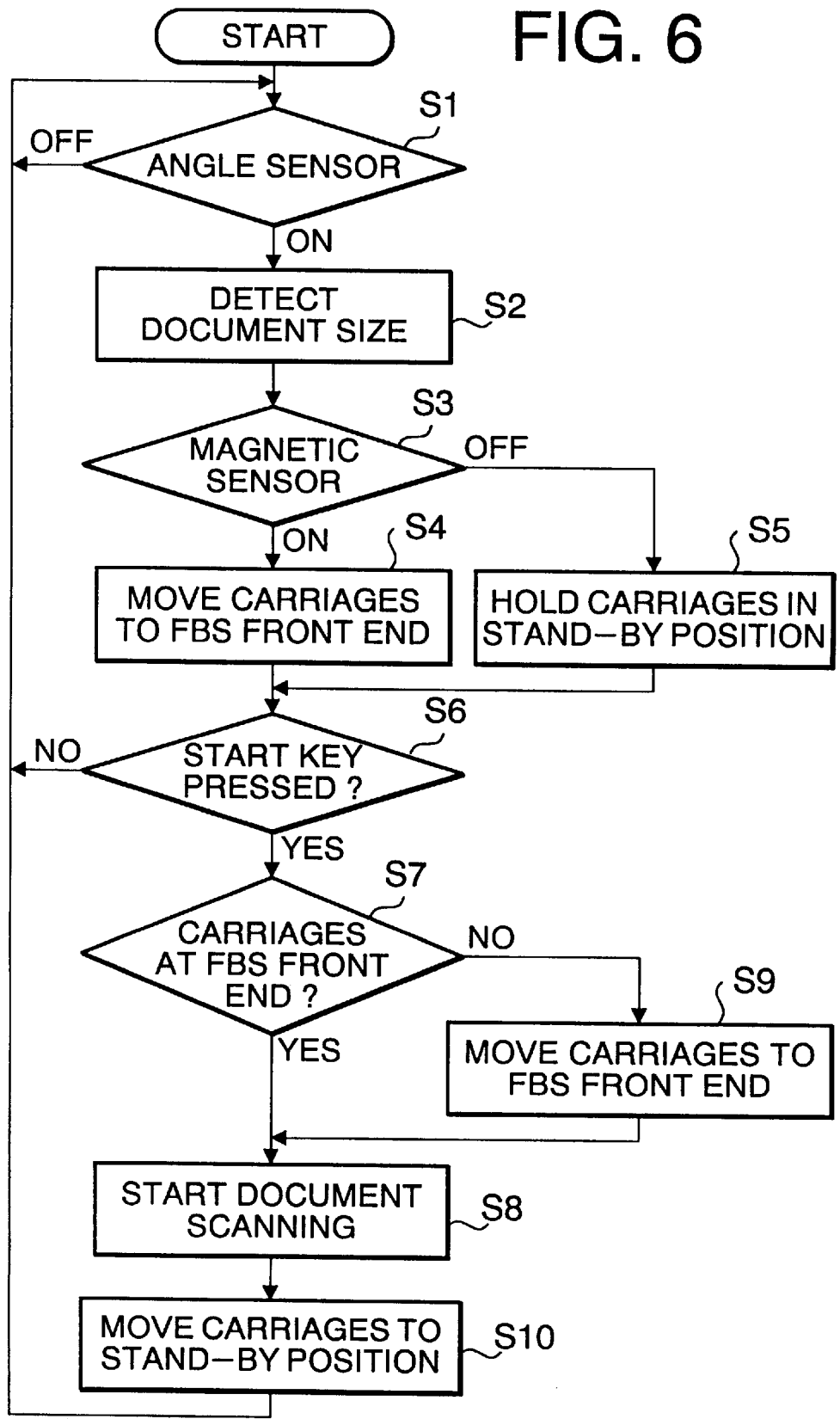
FIG. 6 depicts a flowchart of operations carried out by the image scanning device of the invention when a single sheet of document placed on a flat scanning bed is scanned.

Next, operations of the copier-facsimile system 11 of the invention executed when it scans the original document 21 by the flat bed scanner (FBS) in order to make a copy of the original document will be described in reference to the flowchart shown in FIG. 6. Switching between the copy mode and fax mode is accomplished by pressing of the copy/fax key 87a. The series of operations shown in the flowchart proceeds under the control of CPU 82 based on the control program stored in ROM 83.

For preparation before document scanning, the document 21 is placed on the flat bed 31 and the cover 32 is closed. When the opening angle Al of the cover 32 becomes equal to or less than the predetermined value, the angle sensor 33 outputs a detection signal to CPU 82 (S1). Subsequent to this, the document length sensor 54 outputs a detection signal indicating the length of the document 21 (S2). Eventually, the cover 32 is completely closed. Then, the magnetic sensor 34 outputs a detection signal to CPU 82 (S3).

Upon closing of the cover 32, the stepping motor 52 of the scanning unit 14 is activated to move the carriages 50 and 51 supporting the light source 37 and mirrors 38 to 40 to the second scanning start position P3 from the stand-by position P1 (S4). The second scanning start position P3 is below the flat bed scanner (FBS) front end 31a (FIG. 1).

On the other hand, if no detection signal is output from the magnetic sensor 34 at S3, i.e., if the cover 32 is not closed completely, then the carriages 50 and 51 are maintained in the stand-by position P1 (S5).

Next, when the start key 87b is pressed by the user, the scanning is started (S6). First, the carriage sensor 53 detects whether the carriages 50 and 51 are at the second scanning start position P3 (S7). If the carriages 50 and 51 are at the second scanning start position P3, the carriage position sensor 53 outputs a detection signal. Upon receiving this detection signal, CPU 82 starts the scanning operation of the document 21 on the flat bed 31 by scanning unit 14 (S8).

On the other hand, if CPU 82 does not receive a detection signal from the carriage sensor 53, the carriages 50 and 51 are moved to the second scanning start position P3 (S9). Then, the scanning unit 14 starts scanning the document 21 on the flat bed 31 (S8).

During the document scanning operation, the width of the document 21 is determined from the scanned data. This width data and the length data obtained at step S2 are used to determine the size of the recording paper 56 to be supplied for copying. The selected cut paper is then supplied to the recording unit 17 from the paper cassette 57.

As the document scanning is completed, the carriages 50 and 51 are returned to the stand-by position P1 (S10). Then, the program goes back to S1 to repeat the above described operations.

Figure 7:
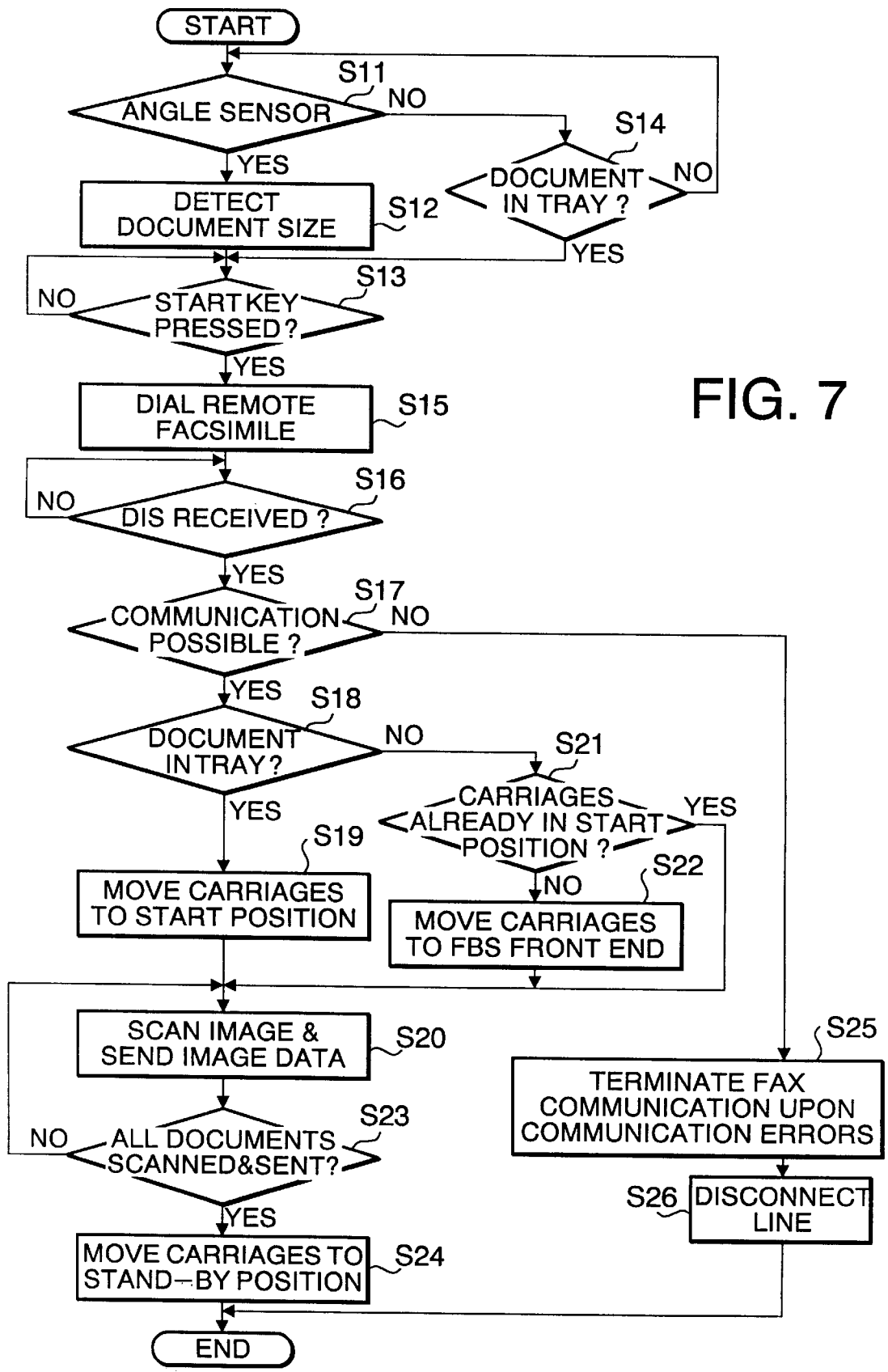
FIG. 7 depicts a flowchart of operations carried out by the image scanning device when an original document is scanned by the image scanning device and transmitted to a remote facsimile machine.

Now, operations of the copier-facsimile system 11 of the present invention performed when it sends facsimile data to a remote facsimile machine will be described in reference to the flowchart shown in FIG. 7. The series of operations shown in the flowchart proceeds under the control of CPU 82 based on the control program stored in ROM 83.

For preparation before document scanning, the document 21 is placed on the flat bed 31 of the flat bed 13 and the cover 32 is closed. When the opening angle A1 of the cover 32 falls below a predetermined value, the angle sensor 33 outputs a detection signal to CPU 82 (S11). Subsequent to this, the document length sensor 54 detects the length of the document 21 (S12). Eventually, the cover 32 is completely closed. Then, the magnetic sensor 34 outputs a detection signal to CPU 82.

If the document 21 is placed on the document tray 22 of the document feeder 12 and the document sensor 27 detects presence of the document (S14), the document size detection (S12) is bypassed.

As the user enters a facsimile number of the desired destination and presses the start key 87b (S13), a call is made to the remote facsimile machine (S15). Upon receiving a response signal (DIS) from the remote facsimile machine (S16), it is determined whether facsimile data transmission to the destination is possible (S17).

If the communication is feasible, the document sensor 27 detects the presence of the document 21 on the tray 22 again (S18). Upon detecting the document 21, the carriages 50 and 51 of the scanning portion 14 are moved from the stand-by position P1 to the first scanning position P2 (S19). Then, the document scanning and image data transmission to the remote facsimile machine are performed (S20).

If there is no document 21 on the tray 22 (S18), then the carriage sensor 53 determines whether the carriages 50 and 51 have already been moved to the second scanning start position P3 (S21). If the carriages 50 and 51 are not in the second scanning start position P3, they are moved there (S22). Then, the scanning of the document 21 and transmitting of the acquired image data to the remote facsimile machine are carried out (S20). If the answer at S21 is YES, the scanning of the document 21 and transmitting of the acquired image data to the remote facsimile machine are carried out immediately (S20).

The size of the document 21 to be scanned at the first scanning position P2 is determined from the scanned data. The size of the document 21 scanned at the second scanning start position P3 is determined from the data obtained from the document length sensor 54 and the scanned data. The data about the document size is transmitted to the remote facsimile machine.

In this manner, all the documents 21 are scanned and transmitted to the remote facsimile machine (S23). Then, the carriages 50 and 51 are returned to the stand-by position P1 (S24).

If it is determined that the facsimile communication with the remote facsimile machine is impossible at S17, this data transmission process is terminated due to the transmission error (S25) and the telephone line L1 is disconnected (S26).

The above described embodiment of the present invention has the following advantages:

(1) The preparation of a document for scanning is detected by the sensors 33 and 34. Using the detection results of these sensors, the carriages 50 and 51 which support at least part of the scanning portion 14 are automatically moved from the stand-by position P1 to the second scanning start position P3 before the user presses the start button. When the start key 87b is pressed by the user, therefore, the carriages 50 and 51 are already at the scanning start position P3. Accordingly, the document scanning immediately starts upon pressing the start button. In the conventional image scanning device, on the other hand, the carriages are moved to the scanning start position from the stand-by position after the start key is pressed and therefore cause a certain time delay between the pressing of the start button and the start of the scanning. In other words, the scanning device of the invention can substantially reduce the waiting time between the pressing of the start button and the actual start of the scanning.

(2) The device 11 of the present invention described in this embodiment is provided with a facsimile data transmission function. Only when the image scanning device detects a communication control signal (DIS) sent from the remote facsimile machine, are the carriages 50 and 51 automatically moved from the stand-by position P1 to the first scanning position P2 or the second scanning start position P3. If the communication control signal is not detected, the carriages are not moved to the scanning position P2 or P3. Therefore, it is possible to prevent wasteful movement of the carriages 50 and 51. Specifically, it is possible to prevent the carriages 50 and 51 from being moved to the position P2 or P3 from the stand-by position P1 when communication with the remote facsimile machine is not possible. In addition, since the carriages 50 and 51 are moved to the position P2 or P3 before the scanning is initiated, it is also feasible to reduce the waiting time between the pressing of the start button and the actual starting of the scanning. This is because generally there is a certain period (several seconds) for procedure signal exchange between a remote facsimile machine and the image scanning device of the invention after detection of DIS until scanning should be started. The carriages 50 and 51 are moved to the position P2 or P3 during this period so that they are in the scanning position when the start key is pressed.

(3) The scanning portion 14 of the illustrated image scanning device includes both the automatic document scanner for a plurality of documents (ADF) and the flat bed scanner (FBS). When the communication control signal from the remote facsimile machine is detected, the carriages 50 and 51 are automatically moved from the stand-by position P1 to the first scanning position P2 which corresponds to the position of ADF or to the second scanning start position P3 which corresponds to the start position of FBS.

It should be noted that the present invention is not limited to the above described embodiment. For example, the following modifications and changes may be made.

In the illustrated embodiment, the carriages 50 and 51 are moved to the second scanning start position P3 as the magnetic sensor 34 outputs the detection signal. However, the carriages 50 and 51 may be moved to the position P3 as the angle sensor 33 outputs its detection signal.

The width of the document 21 on the flat bed 31 may be measured or determined by the scanning portion 14 when the scanning unit 14 is in the stand-by position P1.

What is claimed is:

1. An image scanning device of a type having a scanning portion and a carriage for supporting at least part of the scanning portion, the carriage being adapted to move from a stand-by position to a scanning start position and the image scanning device having a communication function for communication with a remote communication device, comprising:

detection means for detecting a communication control signal sent from the remote communication device;

control means for causing the carriage to move from the stand-by position to the scanning start position upon detecting of the communication control signal by the detection means;

an automatic document feeder for successively feeding a plurality of documents to the scanning portion such that the scanning portion can successively scan the plurality of documents; and a flat bed for placement of a single sheet of document such that the scanning portion can scan the single sheet of document at a time;

wherein the scanning start position for successive scanning of the plurality of documents by the scanning portion is different from the scanning start position for scanning of the single sheet of document at a time by the scanning portion, the carriage is moved to the scanning position of the automatic document feeder when a document is present at the automatic document feeder, and the carriage is moved to the scanning start position of the flat bed scanner when no document is present at the automatic document feeder;

and further including means for confirming if the carriage has been moved to the scanning start position.

2. The image scanning device of claim 1, wherein the communication control signal is DIS (Digital Identification Signal).

* * * * *